United States Patent Office 3,159,591
Patented Dec. 1, 1964

---

3,159,591
FLAME-RESISTANT URETHANE FOAMS
William M. Lanham, Charleston, W. Va., assignor to Union Carbide Corporation, a corporation of New York
No Drawing. Filed June 28, 1961, Ser. No. 120,181
23 Claims. (Cl. 260—2.5)

This invention relates to flame-resistant polyurethane foams, and particularly to such compositions which are self-extinguishing and possess a substantial degree of flame resistance.

Synthetic urethane foams derived from reactions involving isocyanates with active hydrogen-containing polyethers are finding widespread utility in the field of insulation, structural reinforcement, cushioning, electrical encapsulation and in domestic electrical equipment such as refrigerators, freezers and the like. One formidable factor limiting the commercial utilization and growth potential of the foamed urethane products is their risk of flammability in applications where high temperatures and/or exposure to fire may be encountered.

The present invention is based on the discovery that certain cyclic compounds which contain phosphorus are effective for imparting flame resistance to cellular polyurethane foams. It has been found that when cyclic pyrophosphates are incorporated into polyether-isocyanate reaction systems and the mixture conventionally foamed by the one-shot, semiprepolymer or prepolymer technique, the polyurethane foams obtained thereby possess a substantial degree of flame resistance. The achievement of flame resistance according to the invention provides a valuable means whereby polyurethane foams of widely varying and preselected properties can be readily prepared which are self-extinguishing in the ASTM D-1692 flammability test.

The phosphorus compounds utilized for purposes of the invention are esters of pyrophosphoric acid wherein each phosphorus atom is in a five or six membered ring consisting of carbon, oxygen and phosphorus. The structure of the cyclic compounds may be represented by the general formula:

(I) 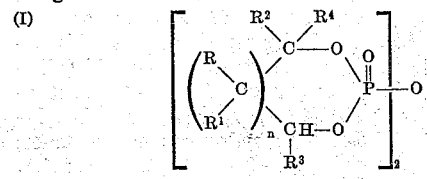

wherein R, $R^1$, $R^2$, $R^3$ and $R^4$ represent, respectively, hydrogen or an alkyl group and $n$ is an integer of 0 or 1.

The symmetrical phosphorus-containing esters conforming to the structural configuration shown above are identified as pyro-2-oxo-1,3,2-dioxaphosphorinanes and pyro-2-oxo-1,3,2-dioxaphospholanes which can be prepared from 2-halo-2-oxo-1,3,2-dioxaphosphorinanes and the corresponding 2-halo-2-oxo-1,3,2-dioxaphospholanes by several methods.

According to one method of synthesis a compound of the general formula:

(II) 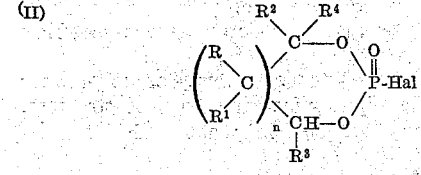

wherein R, $R^1$, $R^2$, $R^3$ and $R^4$, respectively, designates hydrogen or an alkyl group, $n$ is 0 or 1, and Hal designates chlorine or bromine, is reacted, under substantially anhydrous conditions with the anhydrous alkali metal salt of a saturated aliphatic mono-, di- or tricarboxylic acid, at temperatures within the range from about 50° C. to about 200° C., and generally at temperatures within the range between about 50° C. and about 100° C. It is preferred to add the phosphorus-containing reactant slowly or dropwise to a suspension of the anhydrous alkali metal salt of the carboxylic acid in an anhydrous solvent for the desired pyro-compounds until approximately one mol of the phosphorus-containing reactant has been added for each molecular equivalent of the said alkali metal salt. The reaction mixture is washed with water and with a dilute aqueous solution of an alkali metal bicarbonate, and the oily layer which separates is stripped by distillation to kettle temperatures around 100° C. under a pressure of less than 2 mm. of mercury to remove the solvent and last traces of water. The residual product is secured in approximately pure form.

The reaction involved in this method of preparation may be illustrated by the equation:

(III) 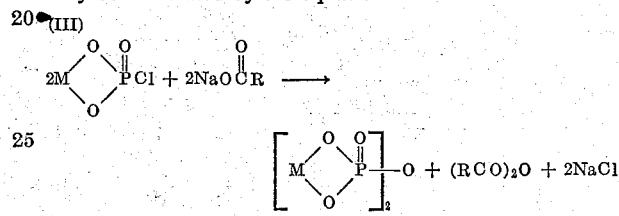

wherein M designates a hydrocarbon radical of the formula —$CR^2R^4(CRR')_nCHR^3$— wherein R, $R^1$, $R^2$, $R^3$ and $R^4$, respectively, designates a member of the class consisting of hydrogen and the alkyl groups, and $n$ is 0 or 1.

The phosphorus compounds also can be made by reacting at temperatures around 10° to 60° C. a 2-halo-2-oxo-1,3,2-dioxaphosphorinane or -dioxaphospholane with water in the presence of just enough of a base, preferably pyridine, to take up the hydrogen chloride formed, according to the reaction (IV) 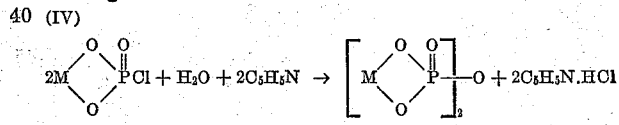

The reaction mixture is filtered, and the filtrate is washed with dilute aqueous sodium bicarbonate and then with water. The washed filtrate then is stripped by distillation to a kettle temperature of about 100° C. under an absolute pressure of less than 2 mm. of mercury. The residual pyrophosphate derivative is securable in high purity.

Among the salts of saturated carboxylic acids useful in one of these processes for making the phosphorus compounds are the alkali metal salts and ammonium salts of the fatty acids having one to eighteen carbon atoms, such as formic, acetic, propionic, butyric, hexoic, 2-ethylhexoic, capric, palmitic and stearic acids; corresponding di salts of oxalic, glutaric, succinic, adipic, n-pimelic and sebaccic acids; and tri salts of tricarballylic acid.

The 2-halo-2-oxo-1,3,2-dioxaphosphorinane and corresponding phospholane derivatives used in making the phosphorus compounds conveniently are made by the dropwise addition of an alkane-1,3-diol or an alkane-1,2-diol, respectively, to a phosphoryl chloride or bromide, preferably in approximately equimolecular proportions, or to a solution of such a phosphoryl halide in an inert hydrogen chloride sequestering agent, such as pyridine, and an inert low-boiling solvent for the reactants, such as ethyl ether. Thus, 2-chloro-5-ethyl-2-oxo-4-propyl-1,3,2-dioxaphosphorinane was prepared in high yield by slowly adding during 1.75 hours 584 grams (4 mols) of 2-ethyl-1,3-hexanediol to 614 grams (4 mols) of phosphoryl chloride while maintaining the reaction mixture at 25° C. under 500 mm. of mercury pressure. The reaction mixture then was kept for one hour at 25° C. under 350 mm. of mercury pressure and finally at 25° C. overnight at 5 mm. of mercury pressure thus eliminating the hydrogen chloride produced. The residual 2-chloro-5-ethyl-2-oxo-4-propyl-1,3,2-dioxaphosphorinane had a chlorine content of 16.02% (theory=15.65%) and a molecular weight of 232 (theory=226.6).

Among alkane-1,2-diols and alkane-1,3-diols useful in the production of the halogen-containing reactants are ethanediol-1,2; propanediol-1,2; butanediol-1,2; ethylethanediol-1,2; 1,2-dimethylethanediol-1,2; propanediol-1,3; butanediol-1,3; pentanediol-1,3; hexanediol-1,3; 2-ethylhexanediol-1,3; 2-butyl-2-ethylpropanediol-1,3; and pentanediol-2,4.

In accordance with the invention, polyurethane foams which are self-extinguishing and possess a substantial degree of flame resistance are prepared by mixing together a polyisocyanate and polyether, building up the urethane polymer network and thereafter developing the foam reaction. The cyclic pyrophosphates can be added to the liquid polyether, the isocyanate or the polyether-isocyanate reaction mixture. The mixture is then foamed in the presence of a catalyst by means of a blowing agent such as water or a fluorocarbon.

The amount of cyclic pyrophosphate used for purposes of the invention is not narrowly critical. The preferred amount should be sufficient to provide a phosphorus content ranging between about 0.25% and 5.0% by weight based on the polyetherisocyanate reaction mixture. If desired, antimony trioxide may be used in conjunction with the phosphorus compound to obtain optimum flame resistance. The amount of antimony trioxide used generally ranges from about 0.5% to 8% by weight based on the polyether-isocyanate reaction mixture.

The active hydrogen-containing polyethers which are used in preparing the polyurethane foams include the linear and branched chain polyethers which have a plurality of acyclic ether oxygens and contain at least two hydroxyl groups. The polyethers are substantially free from functional groups other than hydroxyl groups and have molecular weights, based on their hydroxyl value, ranging from 250 to 5000.

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide useful polyethers include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside, rhammoside, etc. and polyethers prepared by the reaction of alkylene oxide with sucrose, for example:

wherein R is ethylene, propylene, butylene, or mixtures thereof and $n$ is an integer such that the average molecular weight of the polyether is 250 and higher.

Further included are polyethers prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6-di-t-butylcatechol, catechol, orcinol, methylphoroglucinol, 2,5,6-trimethylresorcinol, 4-ethyl-5,6-dimethylresorcinol, n-hexylresorcinol, 4-chloro-5-methylresorcinol, and the like; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9,10-dihydroxyanthracene, 2,3-dihydroxyphenanthrene, etc.

Other polyethers which can be employed are those obtained by reacting 1,2-alkylene oxides or mixtures thereof with polynuclear hydroxybenzenes such as the various di-, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p - hydroxyphenyl)methane and the various diphenols and diphenylol methanes disclosed in U.S. Patents 2,506,486 and 2,744,882, respectively.

Exemplary triphenylol compounds which can be employed include the alpha, alpha, omega, tris(hydroxyphenyl)alkanes such as 1,1,2-tris(hydroxyphenyl)ethanes; 1,1,3-tris(hydroxyphenyl)propanes; 1,1,3-tris(hydroxy-3-methylphenyl)propanes; 1,1,3-tris(dihydroxy - 3 - methylphenyl)propanes; 1,1,3-tris(hydroxy - 2,4 - dimethylphenyl)propane; 1,1,3-tris(hydroxy - 2,5-dimethylphenyl)propanes; 1,1,3-tris(hydroxy - 2,6 - dimethylphenyl)propane; 1,1,4 - tris(hydroxyphenyl)butanes; 1,1,4 - tris(hydroxyphenyl)-2-ethylbutanes; 1,1,4 - tris(dihydroxyphenyl)butanes; 1,1,5-tris(hydroxyphenyl)-3-methylpentanes; 1,1,8-tris(hydroxyphenyl)octanes; 1,1,10-tris(hydroxyphenyl)-decanes, and the like.

Tetraphenylol compounds which can be reacted with 1,2-alkylene oxides include the alpha, alpha, omega, omega, tetrakis(hydroxyphenyl)alkanes such as 1,1,2,2-tetrakis(hydroxyphenyl)ethanes; 1,1,3,3-tetrakis(hydroxy - 3 - methylphenyl)propanes; 1,1,3,3-tetrakis(dihydroxy - 3 - methylphenyl)propanes; 1,1,4,4 - tetrakis(hydroxyphenyl)butanes; 1,1,4,4 - tetrakis(hydroxyphenyl)-2-ethylbutanes; 1,1,5,5-tetrakis(hydroxyphenyl)pentanes; 1,1,5,5-tetrakis(hydroxyphenyl) - 3 - methylpentanes; 1,1,5,5-tetrakis(dihydroxyphenyl)pentanes; 1,1,8,8 - tetrakis(hydroxy - 3 - butylphenyl)octanes; 1,1,8,8-tetrakis(dihydroxy - 3 - butylphenyl)octanes; 1,1,8,8-tetrakis(hydroxy-2,5-dimethylphenyl)octanes; 1,1,10,10-tetrakis(hydroxyphenyl)decanes; and the corresponding compounds which contain substituent groups in the hydrocarbon chain such as 1,1,6,6-tetrakis(hydroxyphenyl) - 2 - hydroxyhexanes; 1,1,6,6-tetrakis(hydroxyphenyl) - 2 - hydroxy - 5 - methylhexanes; 1,1,7,7-tetrakis(hydroxyphenyl)-3-hydroxyheptanes; and the like.

Other particularly useful polyethers which can be employed are the ethylene oxide, propylene oxide, and butylene oxide adducts of phenol-formaldehyde materials such as the novolaks.

Novolaks are believed to be mixtures of polynuclear compounds of the diphenylmethane type of structure, such as 4,4'-dihydroxydiphenylmethane and 2,4'-dihy-

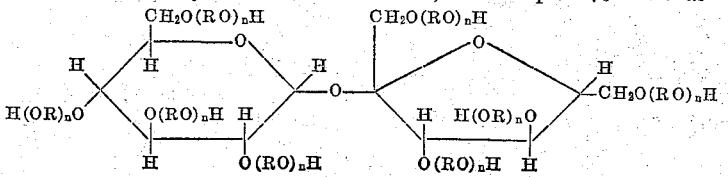

droxydiphenylmethane formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain 4 to 8 units and may contain 12 or more units. Novolaks, as such, are non-curable, thermoplastic resins.

Further included are polyethers prepared by reacting one or more of the alkylene oxides above noted with ammonia or acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylenepentamine, and the like. A particularly suitable polyether is the propylene oxide addition product of diethylenetriamine represented by the formula:

$$[HO(H_6C_3O)_n]_2N-CH_2-CH_2-N-CH_2-CH_2-N[(OC_3H_6)_nOH]_2$$
$$(OC_3H_6)_nOH$$

wherein $n$ represents an integar which provides an average molecular weight of 250 or higher.

Other suitable polyethers include the 1,2-alkylene oxide derivatives of mononuclear primary amines such as o-, m-, and p-phenylenediamine; 2,4- and 2,6-diaminotoluene; 2,6-diamino-p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4-naphthylenediamine; 1,5-naphthylenediamine; 1,8-naphthylenediamine; benzidine; tolidine; 4,4'-methylenedianiline; 3,3'-dimethoxy-4,4'-biphenyldiamine; 3,3'-dichloro-4,4'-biphenyldiamine; 3,3'-dimethyl-4,4'-biphenyldiamine; 4,4'-ethylenedianiline; 4,4'-ethylidenedianiline; 1-fluorenamine; 2,5-fluorenediamine; 2,7-fluoroenediamine; 1,4-anthradiamine; 3,3'-biphenyldiamine; 3,4-biphenyldiamine; 9,10-diaminophenanthrene; and 4,4'-diaminoazobenzene, etc.

Higher functional mono- and polynuclear polyamines which also can be reacted with 1,2-alkylene oxides to provide useful polyether starting materials include 2,4,6-triamino-toluene; 2,3,5-triaminotoluene; 5,6-diaminoacenaphthene, 4,4',4''-methylidynetrianiline, 3,5-diaminobenzoic acid, triaminodiphenyl ethers and sulfides such as 2,4,4'-triaminodiphenyl ether; 2,3',4-triamino-4'-methyldiphenyl ether; 2,3',4-triamino-4'-methoxydiphenyl ether; and polyamines obtained by interaction of aromatic monoamines with formaldehyde or other aldehydes, for example:

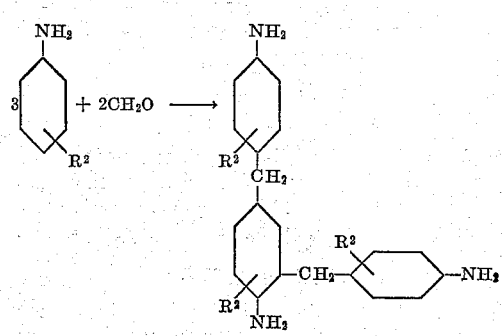

wherein $R^2$ is hydrogen or an alkyl group.

In addition to the above-described polyethers it is also within the scope of the invention to blend varying amounts of polyfunctional compounds with the polyethers before reaction with isocyanates. Such compounds include, among others, alkylene glycols such as ethylene glycol, diethylene glycol, triethylene glycol, tetraethylene glycol and the corresponding propylene homologs such as propylene glycol, dipropylene glycol, etc; saturated aliphatic polyols such as glycerol, 1,2,4-butanetriol, 1,2,6-hexanetriol, trimethylolpropane, pentaerythritol, etc.; acyclic amines such as triethanolamine; triisopropanolamine, etc.; acyclic polyamines such as ethylenediamine, diethylenetriamine, triethylenetetramine, and the like. Further included are the ethylene, propylene and butylene oxide addition products of the above noted aliphatic polyols and amines which have hydroxyl numbers in the range of about 300 to 750. When admixed with the polyether, this modification has the advantage of further diversifying the combinations of characteristics obtainable in the ultimate foam product by increasing the number of available cross-linking sites.

The molecular weight of the polyether used should range from about 250 to about 5000 depending upon the characteristics desired in the foamed urethane product. As a general guide, cellular urethane foams of maximum rigidity are prepared by the use of polyethers having a molecular weight range of about 1800 to 5000.

A variety of isocyanates may be employed for reaction with the polyethers above described to provide urethane foams which can be rendered flame-resistant according to the invention. Preferred isocyanates are polyisocyanates and polyisothiocyanates of the general formula:

$$R(NCG)_x$$

wherein G is oxygen or sulfur, $x$ is an integer of two or more and R is an alkylene, substituted alkylene, arylene or substituted arylene radical, a hydrocarbon, or substituted hydrocarbon containing one or more aryl —NCG bond and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formulae:

$$(RNCG)_x \text{ and } [R(NCG)_x]_y$$

in which $x$ and $y$ are two or more, as well as compounds of the general formula:

$$M(NCG)_x$$

in which $x$ is one or more and M is a monofunctional or polyfunctional atom or group. Examples of this type include ethylphosphonic diisocyanate, C$_2$H$_5$P(O)(NCO)$_2$; phenylphosphonic diisocyanate, C$_6$H$_5$P(NCO)$_2$; compounds containing a ≡Si—NCG group, isocyanates derived from sulfonamides [R(SO$_2$NCO)$_x$], cyanic acid, thiocyanic acid, and compounds containing a metal-NCG group such as tributyltin isocyanate.

A particularly useful polyisocyanate is the product:

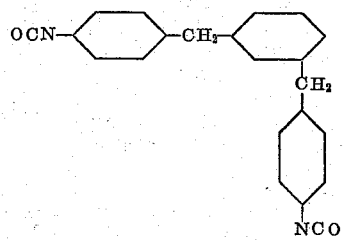

as well as the isomers thereof, obtainable by phosgenation of the reaction product of aniline and formaldehyde.

The preparation of polyether-based urethane foams can be carried out by the one-shot, semiprepolymer or prepolymer techniques, all of which are well known. The preferred procedure is the semiprepolymer technique wherein the polyether reactant is partially extended with excess isocyanate to provide a reaction product containing a high percentage of free isocyanato groups (20 to 35%) which is foamed at a later stage by reaction with additional polyether, catalyst and a blowing agent.

The amount of isocyanate employed will depend upon the density of the urethane foam and the amount of cross linking desired. In general the total —NCO equivalent to total active hydrogen equivalent should be such as to provide a ratio of 0.8 to 1.2 equivalents of —NCO per equivalent of active hydrogen, and preferably a ratio of about 0.9 to 1.1 equivalents.

The foaming operation is preferably effected by liquefied fluorocarbon gases which have boiling points below about 80° F. and above —60° F. The liquefied gases are saturated aliphatic hydrocarbons which vaporize at or below the temperature of the foaming mass. Such gases are at least partially fluorinated and may also be otherwise halogenated.

Preferred blowing agents are the fluorocarbons such as trichloromonofluoromethane; dichlorodifluoromethane, dichlorofluoromethane; 1,1-dichloro-1-fluoroethane; 1,1-difluoro-1,2,2-trichloroethane; and 2-chloro-1,1,1,2,3,3,4,4-nonafluorobutane. The amount of blowing agent used will vary with density desired in the foamed product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the blowing agent.

Catalysts that are suitable for accelerating the polyether-isocyanate reaction include a wide variety of organic tin catalysts, tertiary amine catalysts and combinations thereof.

Among the organic tin compounds that deserve particular mention are stannous acylates such as stannous acetate, stannous octoate, stannous laurate, stannous oleate, etc.; stannous alkoxides such as stannous butoxide, stannous 2-ethylhexoxide, stannous phenoxide, o-, m- and p-stannous cresoxides, etc.; dialkyl tin salts of carboxylic acids, e.g., dibutyltin diacetate, dibutylin dilaurate, dibutyltin maleate, dilauryltin diacetate, dioctyltin diacetate, and the like. Similarly there may be used a trialkyltin hydroxide, dialkyltin oxide or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride, and the like.

Typical tertiary amine catalysts which can be employed include trimethylamine, N-methylmorpholine, N-ethylmorpholine, triethylenediamine, N,N,N',N'-tetramethyl-1,3-butanediamine, triethanolamine, and the like. The tertiary amines may be used as primary catalysts for accelerating the polyether-isocyanate reaction or as a secondary catalyst in combination with the above noted organic tin compounds.

It is also within the scope of the invention to employ small amounts, e.g., about 0.001% to 5.0% by weight, based on the total ingredients, of an emulsifying agent such as a siloxane-oxyalkylene copolymer having from about 10 to 80 percent by weight of siloxane polymer and from 90 to 20 percent by weight of alkylene oxide polymer, such as the copolymers described in U.S. Patent 2,834,748. Although the use of an emulsifier is desirable to influence the type of foam structure that is formed, the foam products of the invention can be prepared without emulsifiers.

The following examples illustrate the best mode now contemplated for carrying out the invention.

EXAMPLE 1

To an agitated suspension of 90 grams (1.1 mols) of anhydrous sodium acetate in 400 grams of toluene there were added dropwise during 20 minutes 227 grams (1 mol) of 2-chloro-5-ethyl-2-oxo-4-propyl-1,3,2-dioxaphosphorinane while maintaining the reaction mixture at 100° C. during this period and for an additional 30 minutes. The reaction mixture then was washed with 800 cc. of water, twice with dilute aqueous sodium bicarbonate solution, and again twice with water. The oily layer which separated was withdrawn and stripped by distillation to a kettle temperature of 100° C. under a pressure of less than 2 mm. of mercury. The residual 5,5'-diethyl-2,2'-dioxo-4,4'-dipropylpyro-1,3,2-dioxaphosphorinane was secured in the form of a yellow liquid having the following properties: $n_D^{30}=1.4657$; specific gravity at 25/15=1.174; molecular weight (ebullioscopic)=374.9 (theory=398.4); percent P=15.51 (theory=15.55); percent C=48.53 (theory=48.23); percent H=8.11 (theory=8.10).

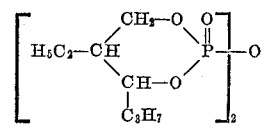

EXAMPLE 2

To an agitated suspension of 53 grams (0.65 mol) of anhydrous sodium acetate in 300 grams of toluene maintained at 100° C. there were added slowly during 15 minutes 100 grams (0.639 mol) of 2-chloro-4-methyl-2-oxo-1,3,2-dioxaphospholane. After an additional 30 minutes at this temperature, 200 cc. of dry acetone and 30 grams of diatomaceous earth filter aid was added to the reaction mixture and the mixture was filtered. The filtrate was stripped by distilaltion to a kettle temperature of 100° C. under 2 mm. of mercury pressure. The residual 4,4'-dimethyl-2,2'-dioxo-pyro-1,3,2-dioxaphospholane,

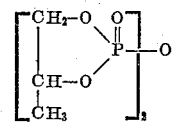

was recovered in 85% yield in the form of a brown water-soluble liquid free from chlorine, and having the following properties: equivalent weight (by saponification)=69.5 (theory=64.5); percent C=27.07 (theory=27.92); percent H=5.11 (theory=4.69).

EXAMPLE 3

Employing the reaction conditions described in Example 1, the reaction of 1 mol of 5-butyl-2-chloro-5-ethyl-2-oxo-1,3,2-dioxaphosphorinane and 1.1 mols of anhydrous sodium acetate in 400 grams of toluene gave a 97% yield of 5,5'-dibutyl-5,5'-diethyl-2,2'-dioxo-pyro-1,3,2-dioxaphosphorinane,

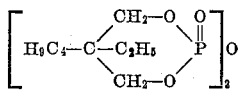

in the form of a mushy solid having the following analysis: percent P=14.25 (theory=14.53); percent C=51.5 (theory=50.71); percent H=8.8 (theory=8.5); equivalent weight (by saponification)=200 (theory=213).

EXAMPLE 4

Following the procedure in Example 1, 1 mol of 2-chloro-5,5-diethyl-2-oxo-1,3,2-dioxaphosphorinane was reacted with 1.1 mols of anhydrous sodium acetate in 400 grams of toluene. Upon addition of 200 cc. of water to the reaction mixture it separated into an aqueous layer containing a suspension of a solid, and an oil layer. The aqueous layer was filtered, and 101 grams of a white crystalline residue was thus obtained and washed with water until free from chlorides. The oil layer was washed with 800 cc. of water, and the washed layer then was stripped by distillation to a kettle temperature of 60° C. under a pressure of less than 2 mm. of mercury. The residual solid was purified by dissolving in 200 cc. of dry acetone and precipitating by the addition of 500 cc. of distilled water. The white crystalline precipitate was removed by filtration, composited with the 101 grams of wet crystals, and dried under vacuum. 2,2'-dioxo-5,5,5', 5'-tetra-ethyl-pyro-1,3,2-dioxaphosphorinane was secured in 81% yield as a white crystalline solid having the following properties: melting point=182°–190° C.; percent purity (by saponification)=98.4; percent P=17.10 (theory=16.72); percent C=45.45 (theory=45.40); percent H=7.60 (theory=7.62).

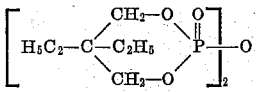

EXAMPLE 5

To an agitated suspension of 83 grams (1.01 mols) of anhydrous sodium acetate in 400 grams of toluene held at 100° C., there were added dropwise during 20 minutes 171 grams (1 mol) of 2-chloro-4-methyl-2-oxo-1,3,2-dioxaphosphorinane. After an additional 30 minutes at that temperature, the reaction mixture was mixed with 30 grams of a diatomaceous earth filtering aid and was filtered. The filtrate was stripped by distillation to a kettle temperature of 100° C. under a pressure of less than 2 mm. of mercury. The tan residue of 4,4'-dimethyl-2,2'-dioxopyro-1,3,2-dioxaphosphorinane had the following analysis: percent P=20.75 (theory=21.66); percent C=33.41 (theory=33.57); percent H=5.59 (theory =5.63).

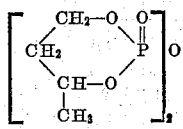

EXAMPLE 6

Following the procedure described in Example 5, 1 mol of 2-chloro-4,6-dimethyl-2-oxo-1,3,2-dioxaphosphorinane was reacted with 1.1 mols of anhydrous sodium acetate suspended in toluene. The reaction was filtered and the desired product was extracted from the residue using dry acetone. Upon removal of the acetone under vacuum, 84 grams of 2,2'-dioxo-4,4',6,6'-tetramethyl-pyro-1,3,2-dioxaphosphorinane was secured in the form of white crystals having the following properties: melting point=160°–166° C.; percent P=19.40 (theory=19.72); percent C=37.65 (theory=38.22); percent H=6.26 (theory=6.41). A yield of 54%, based upon the phosphorous-containing reactant, was secured.

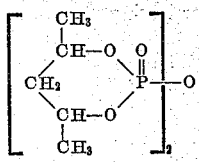

EXAMPLE 7

To an agitated suspension of 0.6 mol of sodium butyrate in 300 grams of toluene held at 100° C., there were added dropwise 113 grams (0.5 mol) of 2-chloro-5-ethyl-2-oxo-4-propyl-1,3,2-dioxaphosphorinane. After 30 minutes more at this temperature, the reaction mixture was washed with 800 cc. of water, and the oil layer which then separated was stripped by distillation to a kettle temperature of 75° C. under a pressure of less than 2 mm. of mercury. The almost colorless residue of 111 grams contained 28.6% of butyric anhydride. A 30 gram sample of this residue was further stripped by distillation to a kettle temperature of 155° C. under a pressure of less than 2 mm. of mercury, yielding 21 grams of 5,5'-diethyl-2,2'-dioxo-4,4'-dipropyl-pyro-1,3,2-dioxaphosphorinane in the form of a slightly yellow viscous liquid having $n_D^{30}$=1.4630; equivalent weight (by saponification)=180 (theory=199); percent yield=78 (based upon the phosphorus-containing reactant).

EXAMPLE 8

To an agitated solution of 113 grams (0.5 mol) of 2-chloro-5-ethyl-2-oxo-4-propyl-1,3,2-dioxaphosphorinane in 100 cc. of benzene maintained at 10°–15° C., there were added dropwise during 20 minutes a solution of 5 grams (0.278 mol) of water and 45 grams (0.57 mol) of pyridine. The reaction mixture is then heated at 40°–50° C. for 6 hours, cooled and filtered to remove pyridine hydrochloride. The filtrate was washed with a dilute aqueous solution of sodium bicarbonate, and then was washed with water until neutral toward litmus paper. It was then stripped by distillation to a kettle temperature of 100° C. under a pressure of less than 2 mm. of mercury. The desired 5,5'-diethyl-2,2'-dioxo-4,4'-dipropyl-pyro-1,3,2-dioxaphosphorinane was secured in 90% yield, based upon the phosphorus-containing reactant, in the form of a clear, colorless liquid having the following properties: $n_D^{30}$=1.4659; percent purity=99 (by saponification). It was free from chlorine, and had a salt content equal to 0.01 cc. of normal $HClO_4$/gram.

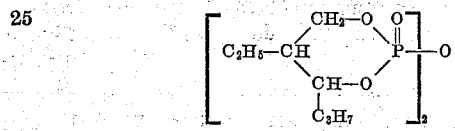

EXAMPLE 9

To an agitated suspension of 203 grams (2.48 mols) of anhydrous sodium acetate in 700 grams of toluene maintained at 100° C. there were added slowly 447 grams (2.25 mols) of 2-chloro-5-ethyl-5-methyl-2-oxo-1,3,2,-dioxaphosphorinane. After an additional 3½ hours at this temperature, the reaction mixture was cooled and filtered. The filtrate was stripped by distillation to a kettle temperature of 90° C. under 15 mm. of mercury pressure. The residual solid was washed with 500 cc. of ethyl ether, filtered and dried to recover 193 grams of 5,5'-diethyl-5,5'-dimethyl-2,2'-dioxo-pyro-1,3,2-dioxaphosphorinane, which had the following analysis: percent P=18.30 (theory=18.10); percent C=42.38 (theory=42.11); percent H=6.98) theory=7.06); M.P.=155–159° C.

EXAMPLE 10

To an agitated suspension of 316 grams of anhydrous sodium acetate (3.8 mols) in 1400 grams of toluene maintained at 100° C. there were added slowly over 45 minutes 744 grams (3.5 mols) of 2-chloro-5-methyl-2-oxo-5-propyl-1,3,2-dioxophosphorinane in 300 grams of toluene. After an additional 2 hours at this temperature, the reaction mixture was washed separately 4 times with 500 cc. of distilled water. While agitating the mixture sodium bicarbonate was added and the mixture thereafter washed with 500 cc. of distilled water. The mixture was stripped by distillation to a kettle temperature of 100° C. under 2 mm. of mercury pressure. 421 grams of 5,5'-dimethyl-2,2'-dioxo-5,5'-dipropyl-pyro-1,3,2-dioxaphosphorinane were obtained.

EXAMPLE 11

110 grams of a mixture comprising 86 percent by weight of a propylene oxide addition product of 1,1,3-tris(hydroxyphenyl)propane (Hydroxyl No. 261) and 14 percent by weight of 1,2,6-hexanetriol were mixed with 123 grams of a semiprepolymer prepared therefrom by reaction with tolylene diisocyanate (28.8% total free NCO), 0.7 gram of a silicone oil surfactant (siloxane-oxyalkylene copolymer), 0.7 gram dibutyltin dilaurate, 0.11 gram potassium laurate and 40–44 grams trichloromonofluoromethane. The foamed product was cured for 10 minutes at 70° C.

EXAMPLE 12

100 grams of a propylene oxide addition product of sorbitol (Hydroxyl No. 500) and 134 grams of a semiprepolymer prepared therefrom by reaction with tolylene diisocyanate (29.9% total free NCO) were mixed with 1.0 gram dibutyltin dilaureate, 0.6 gram of a silicone oil surfactant (siloxane-oxyalkylene copolymer), 0.1 gram potassium laurate and 49 grams trichloromonofluoromethane. The foamed product was cured for 10 minutes at 70° C.

EXAMPLE 13

100 grams of material comprising 80 percent by weight of a propylene oxide addition product of 1,1,3-tris(hydroxyphenyl)propane blended with a propylene oxide addition product of glycerol to a Hydroxyl No. of 372 were mixed with 20 percent by weight of a propylene oxide addition product of diethylenetriamine (Hydroxyl No. 682). To this mixture was added 118.5 grams of a semiprepolymer prepared from a mixture comprising a propylene oxide addition product of 1,1,3-tris(hydroxyphenyl)propane blended with a propylene oxide addition product of glycerol (29.4% total free NCO), 0.5 gram of a silicone oil surfactant (siloxane-oxyalkylene copolymer), 0.2 gram dibutyltin dilaurate, 0.1 gram potassium laurate and 41 grams trichloromonofluoromethane. The foamed product was cured for 10 minutes at 70° C.

EXAMPLE 14

100 grams of a propylene oxide addition product of α-methylglucoside and 124.5 grams of a semiprepolymer prepared therefrom (28.6% total free NCO) were mixed with 0.6 gram of a silicone oil surfactant (siloxane-oxyalkylene copolymer), 0.6 gram dibutyltin dilaureate, 0.2 gram N,N,N',N'-tetramethyl-1,3-butanediamine, 0.1 gram potassium laurate and 41 grams trichloromonofluoromethane. The foamed product was cured for 10 minutes at 70° C.

EXAMPLE 15

110 grams of a propylene oxide addition product of 4,4'-diaminodiphenylmethane (Hydroxyl No. 357) and 104.5 grams of a semiprepolymer prepared therefrom by reaction with tolylene diisocyanate (30.3% total free NCO) were mixed with 0.7 gram dibutyltin dilaurate, 0.7 gram of a silicone oil surfactant (siloxane-oxyalkylene copolymer), 0.11 gram potassium laurate and 44 grams of trichloromonofluoromethane. The foamed product was cured for 10 minutes at 70° C.

Polyurethane foams, as prepared in Examples 11 to 15, were blended prior to foaming with varying amounts of cyclic pyrophosphates and tested for flammability characteristics in accordance with the "Tentative Method of Test for Flammability of Plastic Foams and Sheeting," ASTM D-1692-59-T. In this test the flame of a Bunsen burner, having a blue cone of about 1½ inches in height, is applied separately to the front edge of ten foam specimens, 6" x 2" x ½", and allowed to remain in contact therewith for a period of sixty seconds. The extent of burning is considered the furthermost point reached by the flame front whereas the burning rate in inches per minute is a measure of the time necessary for the flame front to consume five inches of the foam specimen. A sample is judged "non-burning" if no evidence of ignition, such as flame or progressive glow, is seen in each specimen after removal of the flame. If the flame front of two or more specimens reaches the five inch mark the sample is judged "burning." A sample is judged "self-extinguishing" when ignition of the ten specimens gives an extent of burning less than five inches. The term "flame-resistant" as employed herein is used to characterize a material which does not burn readily. The terms "burning," "self-extinguishing" and "non-burning" are defined in accordance with the above test.

The data tabulated in Table I below illustrates that polyurethane foams prepared according to the invention can be readily rendered flame-resistant through use of cyclic pyrophosphates.

*Table I*

| Urethane, Example | 11 | 11 | 11 | 11 | 11 | 11 | 11 | 12 | 13 | 13 | 14 | 15 | 15 | 15 | 15 |
|---|---|---|---|---|---|---|---|---|---|---|---|---|---|---|---|
| Pyrophosphate, Example | 4 | 4 | 10 | 10 | 9 | 1 | 1 | 9 | 4 | 9 | 9 | 4 | 4 | 2 | — |
| Weight percent P | 2.0 | 1.5 | 2.0 | 1.5 | 2.0 | 2.0 | 1.49 | 2.5 | 1.5 | 2.5 | 2.5 | 1.5 | 1.5 | 2.5 | |
| Weight percent $Sb_2O_3$ | 0 | 2.0 | 0 | 2.0 | 0 | 0 | 4 | 0 | 2.0 | 0 | 0 | 0 | 2 | 0 | |
| Density, lbs./ft.[3] | 1.9 | 2.0 | 2.0 | 1.9 | 1.9 | 2.1 | 2.0 | 1.9 | 2.0 | 2.1 | 2.2 | 2.1 | 2.1 | 2.7 | 1.8 |
| Appearance [2] | AAA | AAA | BBB | AAA | BBB | AAA | AAA | AAA | AAA | AAA | AAA | AAA | AAA | AAA | AAA |
| ASTM Class | S | S | S | S | S | S | S | S | S | B | S | S | S | S | B |
| Rate or Extent | 2.2 in. | 2.0 in. | 2.6 in. | 1.6 in. | 1.9 in. | 3.5 in. | 3.1 in. | 2.1 in. | 3.3 ipm. | 1.8 in. | 2.6 in. | 1.5 in. | 1.9 in. | 3.2 in. | 3.3 ipm. |
| Ig/B[1] | 13/56 | 14/47 | 13/62 | 13/32 | 13/42 | 10/79 | 12/57 | 12/45 | 5/121 | 13/53 | 11/63 | 11/35 | 8/41 | 20/62 | |

[1] Ignition time in seconds/extinguishment time in seconds.
[2] The appearance of the foam is rated by a three-letter code with the first letter estimating cell size, the second letter uniformity of cell size and the third letter bulk flaws (splits, ridges, burns, etc.) wherein:

| 1st Letter | 2nd Letter | 3rd Letter |
|---|---|---|
| A = Fine. | Good. | None. |
| B = Medium. | Fair. | Minor. |
| C = Large. | Poor. | Severe. |

What is claimed is:

1. A method for the preparation of flame-resistant polyurethane foams in which a mixture consisting essentially of a polyether having at least two active hydrogens, a catalyst, an organic polyisocyanate, a blowing agent and a minor amount of a phosphorus compound corresponding to the formula:

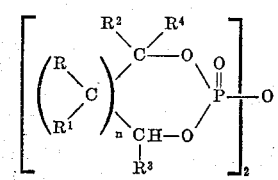

wherein R, $R^1$, $R^2$, $R^3$ and $R^4$, respectively, designates a radical of the class consisting of hydrogen and the lower alkyl groups; and $n$ is a number of the class consisting of 0 and 1, is reacted to produce said foams.

2. The method of claim 1 wherein the phosphorus compound is a pyro-2-oxo-1,3,2-dioxaphosphorinane.

3. The method of claim 1 wherein the phosphorus compound is a pyro-2-oxo-1,3,2-dioxaphospholane.

4. The produce produced by the method of claim 1.

5. A method for the preparation of flame-resistant polyurethane foams in which a mixture consisting essentially of a polyoxyalkylene polyol, a catalyst, an organic polyisocyanate, a fluorocarbon blowing agent and a minor amount of a phosphorus compound sufficient to provide a phophorus content between about 0.25% and 5.0% by weight corresponding to the formula:

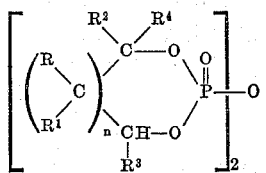

wherein R, R¹, R², R³ and R⁴, respectively, designates a radical of the class consisting of hydrogen and the lower alkyl groups; and *n* is a number of the class consisting of 0 and 1, is reacted to produce said foams.

6. The method of claim 5 wherein the phosphorus compound is a pyro-2-oxo-1,3,2-dioxaphosphorinane.

7. The method of claim 5 wherein the phosphorus compound is a pyro-2-oxo-1,3,2-dioxaphospholane.

8. The method of claim 6 wherein the phosphorus compound is 5,5'-diethyl-2,2'-dioxo-4,4'-dipropyl-pyro-1,3,2-dioxaphosphorinane.

9. The method of claim 6 wherein the phosphorus compound is 5,5'-dibutyl-5,5'-diethyl-2,2'-dioxo-pyro-1,3,2-dioxaphosphorinane.

10. The method of claim 6 wherein the phosphorus compound is 2,2'-dioxo-5,5,5',5'-tetraethyl-pyro-1,3,2-dioxaphosphorinane.

11. The method of claim 6 wherein the phosphorus compound is 4,4'-dimethyl-2,2'-dioxo-pyro-1,3,2-dioxaphosphorinane.

12. The method of claim 6 wherein the phosphorus compound is 2,2'-dioxo-4,4',6,6'-tetramethyl-pyro-1,3,2-dioxaphosphorinane.

13. The method of claim 6 wherein the phosphorus compound is 5,5'-diethyl-5,5'-dimethyl-2,2'-dioxo-pyro-1,3,2-dioxaphosphorinane.

14. The method of claim 6 wherein the phosphorus compound is 5,5'-dimethyl-2,2'-dioxo-5,5'-dipropyl-pyro-1,3,2-dioxaphosphorinane.

15. The method of claim 7 wherein the phosphorus compound is 4,4'-dimethyl-2,2'-dioxo-pyro-1,3,2-dioxaphospholane.

16. The product produced by the method of claim 8.
17. The product produced by the method of claim 9.
18. The product produced by the method of claim 10.
19. The product produced by the method of claim 11.
20. The product produced by the method of claim 12.
21. The product produced by the method of claim 13.
22. The product produced by the method of claim 14.
23. The product produced by the method of claim 15.

No references cited.